D. B. NEAL.
Evaporating Pan.
No. 67,668.
Patented Aug. 13, 1867.
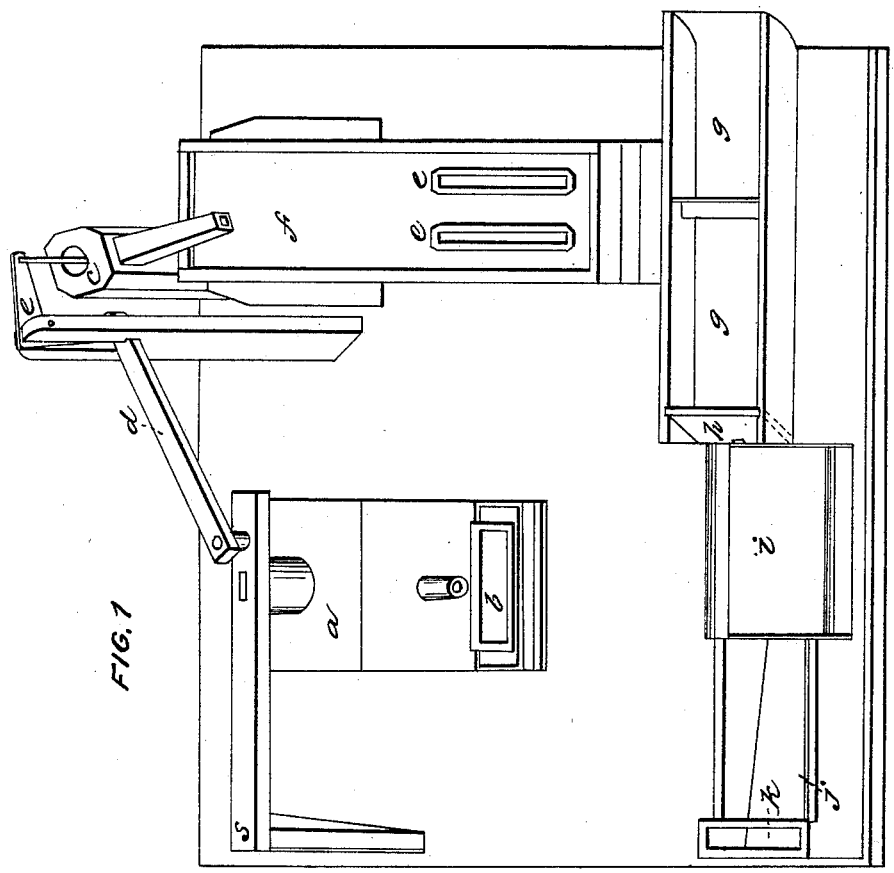
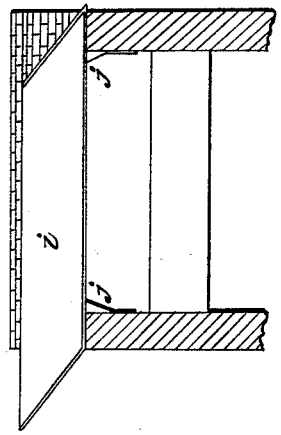
WITNESSES:
Johnson B. Neal.
Edgar E. Neal.
INVENTOR:
Dr. D. B. Neal.

United States Patent Office.

DANIEL B. NEAL, OF MOUNT GILEAD, OHIO.

Letters Patent No. 67,668, dated August 13, 1867.

---

IMPROVED APPARATUS FOR DEFECATING AND EVAPORATING SORGHUM JUICE.

---

The Schedule referred to in these Letters Patent and making part of the same.

---

Be it known that I, D. B. NEAL, of Mount Gilead, in the county of Morrow, and State of Ohio, have invented new and useful Improvement in Constructing an Apparatus for "Defecating and Evaporating Sorghum Juice into Sirup or Sugar;" and I do hereby declare that the following is a full, clear, and exact description of the construction and operation of the same, reference being had to the annexed drawings, making a part of this specification, in which—

Figure 1 shows the position and arrangement of the parts.

Figure 2 is a sectional view of the furnace and one of the finishing-pans.

Letter $a$ is intended to represent a cane-mill of any known form, arranged to be driven by horses. Letter $s$ represents the sweep. Letter $b$ represents what I term an overflow gravel defecator. It is made in such a manner that the juice from the mill will run into the defecator-box, and, when filled, will overflow into the box or trough underneath, which passes it off to the cistern, the sand or gravel settling to the bottom of the box. Letter $c$ represents a pump, which is operated by means of the right-angle arms $e$ and the connecting-rod $d$, attached to the crank on the end of the sweep. This pump is used for pumping the juice from the tank into the defecators $f$. There are two or more of these defecators, setting one above the other, having slotted openings, shown at letters $e\ e$, with raised flanges around the openings so arranged that, when the defecator is partly filled, the juice will overflow through these holes into the defecator underneath, and so on, until it has passed down to the lower one. The glucose matter in the sorghum juice settling about one-eighth of an inch very rapidly, the object of these overflows is to allow the pure juice to pass down through the holes and retain the glucose matter in the defecators. Letters $g\ g$ represent the evaporating-pan, having a square shelf or step in the middle, with a passage for the juice underneath, which I term a scum-shelf, this pan having an end inclined inward for counteracting the current of the juice whilst boiling, for the purpose of throwing the scum upon the scum-shelf. Letters $i\ i$ represent the finishing-pans, two in number, with the sides inclined, as shown in fig. 2, for counteracting the currents and facilitating the scumming. Letters $j\ j$ represent recesses made in the edge of the furnace, by riveting on sheet iron or otherwise, for the purpose of holding a body of sand or similar substance for preventing the smoke from leaking out underneath the pans.

I am aware that inclined partitions have been patented, but not ends; consequently, what I claim as new, and desire to secure by Letters Patent, is—

1. Constructing the sides or ends of evaporating-pans to incline inwardly.

2. I claim the overflow defecators $f$, with their openings $e\ e$, as shown and described, for the purpose specified.

3. I claim operating a pump by an attachment to the sweep, as shown and described, or its equivalent, for the purpose specified.

4. I claim the overflow gravel defecators, as shown and described.

5. I claim the recesses $j\ j$ on the edge of the furnace for the purpose specified.

D. B. NEAL.

Witnesses:
    H. G. BAKER,
    HENRY C. SERGEANT.